Nov. 14, 1950 E. R. EHLERT 2,530,350
UNLOADER FOR FARM VEHICLES
Filed Jan. 8, 1949 2 Sheets-Sheet 1

INVENTOR.
E. R. EHLERT
BY Merrill M. Blackburn
ATTORNEY

Nov. 14, 1950  E. R. EHLERT  2,530,350
UNLOADER FOR FARM VEHICLES
Filed Jan. 8, 1949  2 Sheets-Sheet 2

INVENTOR.
E. R. EHLERT
BY
Merrill M. Blackburn
ATTORNEY

Patented Nov. 14, 1950

2,530,350

UNITED STATES PATENT OFFICE 2,530,350

UNLOADER FOR FARM VEHICLES

Elmer R. Ehlert, Tipton, Iowa, assignor to Tipton Mfg. Co., Inc., Tipton, Iowa, a corporation of Iowa Application January 8, 1949, Serial No. 69,912

1 Claim. (Cl. 214—82)

My present invention relates to means for unloading the boxes of farm vehicles, such as trucks, the same being intended especially for the unloading of chopped hay. The primary purpose of this invention is to provide an improved structure for the unloading of load-carrying boxes of farm vehicles; the provision of a mechanism for the purpose stated which will require a jack of only approximately one-half the length of the vehicle, while providing for the movement of a false or movable endgate the entire length of the box; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 1:
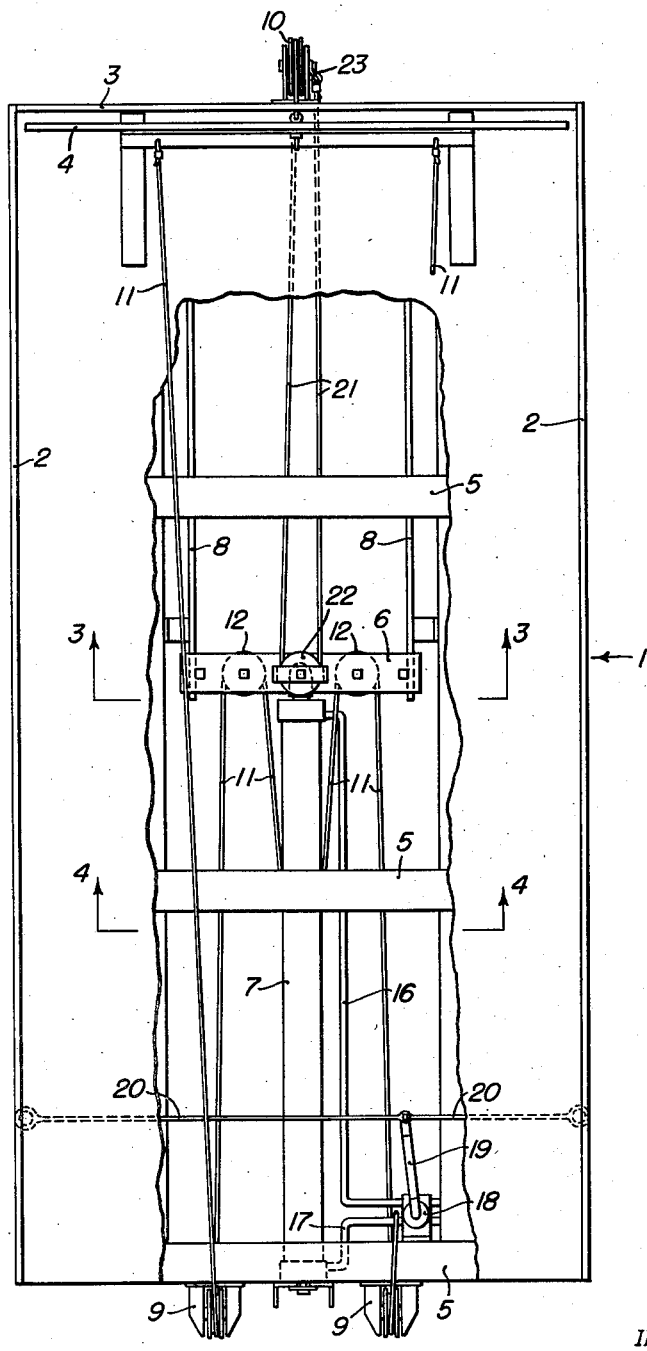
Fig. 1 represents a plan view of a load-carrying box with a part of the floor boards broken away to show the arrangement of the mechanism for moving the endgate.
Figure 2:
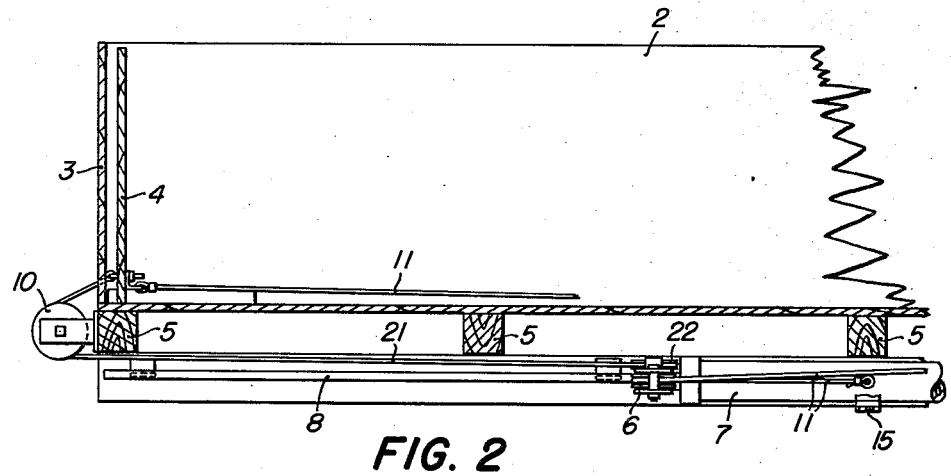
Fig. 2 represents a fragmentary longitudinal section of the structure shown in Fig. 1, the section being offset somewhat from the longitudinal center line of the box.
Figure 3:
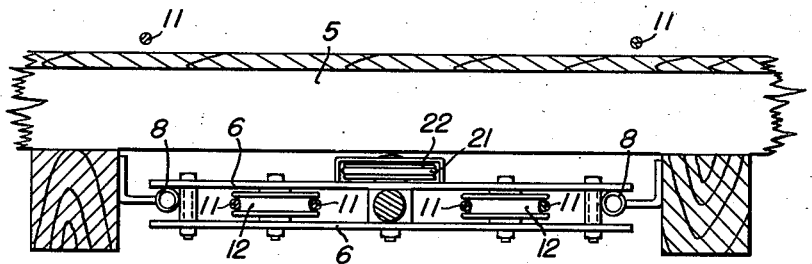
Fig. 3 represents a transverse section of the structure shown in Fig. 1, approximately along the plane indicated by the line 3—3 of that figure.

Reference will now be made in greater detail to the annexed drawings for a more complete description of this invention. The box 1 for a vehicle for hauling a load, such as chopped hay, has sides 2, and a fixed endgate 3, together with a movable or false endgate 4. The bottom of the box is shown as partly broken away to expose the structure beneath the same, including fixed cross frame members 5 and a movable crossbar 6. A hydraulic jack 7 has one end secured to an end frame member 5, while the exposed end of the piston of the jack 7 is secured to the movable crossbar 6 which slides on the guide bars 8. A pair of pulleys and housings 9 are secured to the fixed end bar or frame member 5, and a pulley 10 is secured to the opposite end of the body, preferably on the fixed crossbar 5, as shown in Fig. 2.

Figure 4:
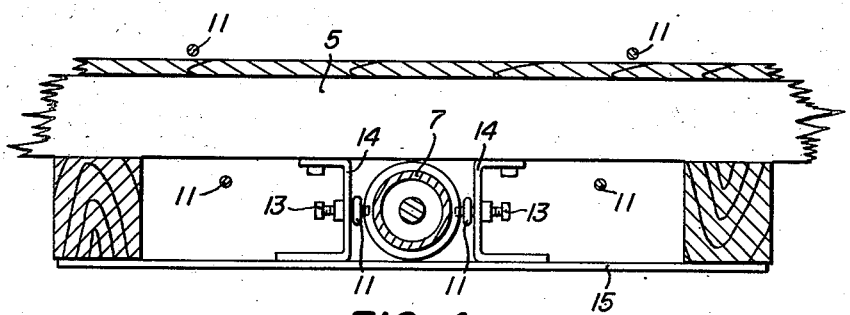
Fig. 4 represents a transverse section approximately along the plane indicated by the line 4—4, Fig. 1.

I prefer to have a pair of cables 11 fastened to the movable or false endgate 4, and these cables 11 pass through the pulleys 9, and from these through the pulleys 12 mounted in the movable crossbar 6. From the pulleys 12, these cables 11 pass toward the rear of the box where they are secured to the jack 7 by the bolts 13, as is clearly shown by Fig. 4. Angular brackets 14 are secured to the frame member 5 and a supporting member 15 which helps to support the jack 7.

Pipes 16 and 17 are connected to the two ends of the jack 7 and to a valve 18 which controls the passage of hydraulic fluid from a pipe underneath the box body and which is connected to the source of supply of the hydraulic fluid. A valve handle 19 has a pair of control rods 20 connected thereto which extend out toward the sides of the box so that the operation of the hydraulic jack may be controlled. The rods 20 extend from the crank 19 to the opposite sides of the box so that the valve 18 may be controlled from either side thereof.

In order to return the movable endgate 4 to the forward end of the box, a cable 21 is connected thereto and passes out through the fixed endgate 3, around the pulley 10, rearwardly to and through the pulley 22, and then forwardly to its connection 23 with the pulley 10.

It will be seen from what has been said above that when the jack 7 is extended, the movable crossbar 6 will be moved forwardly and, since the rear ends of the cables 11 are fixedly connected at 13, the cables will be pulled around the pulleys 12 and 9 as the crossbar 6 goes forwardly and, therefore, they will pull the movable endgate 4 rearwardly. Since the two short ends of the cables 11 are elongated while the long runs of cables 11 are shortened, it will also be seen that the endgate 4 will move rearwardly twice as fast as the crossbar 6 moves forwardly. This means that the endgate 4 will travel twice as far as the crossbar 6. Hence, while the crossbar 6 is moving half the length of the box, the endgate 4 will move substantially the entire length thereof.

Since one end of cable 21 is attached to the false endgate 4, that end will be moving rearwardly with the endgate while the crossbar 6 and pulley 22 move forwardly. During such movement of crossbar 6, the two runs of cable 21, connected to the pulley 22, will both be shortened, while the other end, passing over pulley 10, will be lengthened, the result being that there will be no slack developed in either cable 11 or cable 21. While the crossbar 6 is moving rearwardly to return the endgate 4 from a rearward position to its forward position, just the opposite in the moving cables will take place in comparison to what has been described above.

It will of course be understood that there may be departures from the specific construction disclosed herein without departing from the spirit of this invention or the scope of the appended claim.

Having now described my invention, I claim:

A vehicle box unloader comprising a false endgate for the vehicle box, cables connected thereto for moving the endgate toward one end of the box, said cables extending from the endgate to the opposite end of the box and over pulleys at that end, a crossbar under the box approximately midway of the length thereof, pulleys carried by said crossbar, said cables passing from the first pulleys to and through the second pulleys and then in the general direction of the first pulleys, a hydraulic jack secured at one end to said crossbar and at its second end to the framework of the box between the first pulleys, said cables passing from the second pulleys to the body of the endgate to which they are secured, a single cable secured at one end to the central part of the false endgate and passing through the adjacent true endgate, a central pulley on the crossbar and a central pulley on the frame of the box adjacent the true endgate, the single cable, after passing through the true endgate, passing through the last mentioned pulley, to and through the central pulley on the crossbar and from there to the end of the box having the true endgate where it is securely fastened.

ELMER R. EHLERT.

REFERENCES CITED

The following references are of record in the file of this patent:

UNITED STATES PATENTS

| Number | Name | Date |
|---|---|---|
| 2,298,982 | Smith | Oct. 13, 1942 |
| 2,318,886 | Paiement | May 11, 1943 |
| 2,463,643 | Recker | Mar. 8, 1949 |